（12）United States Patent
Rafey

(10) Patent No.: US 11,256,593 B2
(45) Date of Patent: Feb. 22, 2022

(54) SOFTWARE CONTAINER IMAGE QUALITY RANKING BASED ON PERFORMANCE OF INSTANCES OF THE SOFTWARE CONTAINER IMAGES

(71) Applicant: Dell Products L.P., Round Rock, TX (US)

(72) Inventor: Mohammad Rafey, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 16/866,792

(22) Filed: May 5, 2020

(65) Prior Publication Data

US 2021/0349801 A1  Nov. 11, 2021

(51) Int. Cl.
*G06F 11/34* (2006.01)
*G06F 11/32* (2006.01)
*G06F 11/30* (2006.01)

(52) U.S. Cl.
CPC ........ *G06F 11/3409* (2013.01); *G06F 11/302* (2013.01); *G06F 11/3075* (2013.01); *G06F 11/323* (2013.01)

(58) Field of Classification Search
CPC ............... G06F 11/3409; G06F 11/302; G06F 11/3075; G06F 11/323
USPC ....................................................... 702/182
See application file for complete search history.

(56) References Cited

U.S. PATENT DOCUMENTS

| 2004/0249831 | A1* | 12/2004 | Fagin | G06F 16/24553 |
| 2008/0097941 | A1* | 4/2008 | Agarwal | G06F 16/951 |
| | | | | 706/12 |
| 2014/0095243 | A1* | 4/2014 | Solomon | G06N 5/02 |
| | | | | 705/7.22 |
| 2021/0089361 | A1* | 3/2021 | Rafey | G06F 9/505 |
| 2021/0097037 | A1* | 4/2021 | Babol | G06F 21/53 |

OTHER PUBLICATIONS

VMware Tanzu Network, "VMware Harbor Registry," https://network.pivotal.io/products/harbor-container-registry, Apr. 23, 2020, 2 pages.

(Continued)

*Primary Examiner* — John H Le
(74) *Attorney, Agent, or Firm* — Ryan, Mason & Lewis, LLP

(57) ABSTRACT

An apparatus includes a processing device comprising a processor coupled to a memory. The processing device is configured to obtain metrics characterizing performance, over two or more periods of time, of software container instances of each of a plurality of software container images. The processing device is also configured to determine, for each of the two or more periods of time, a periodic quality ranking of the plurality of software container images based at least in part on the obtained metrics. The processing device is further configured to generate an overall quality ranking of the plurality of software container images utilizing a consensus ranking aggregation algorithm configured to aggregate the periodic quality rankings of the plurality of software container images across the two or more periods of time, and to publish the overall quality ranking of the plurality of software container images to a software container registry.

20 Claims, 14 Drawing Sheets

(56) References Cited

OTHER PUBLICATIONS

Pivotal Container Service, "Production-Ready Kubernetes for the Enterprise," https://pivotal.io/platform/pivotal-container-service, Accessed Mar. 4, 2020, 12 pages.

L. Tal, "Top Ten Most Popular Docker Images Each Contain at least 30 Vulnerabilities," https://snyk.io/blog/top-ten-most-popular-docker-images-each-contain-at-least-30-vulnerabilities/, Feb. 26, 2019, 10 pages.

VMware Enterprise PKS, "Deploy, Run and Manage Kubernetes for Production," https://cloud.vmware.com/vmware-enterprise-pks, Accessed Mar. 4, 2020, 11 pages.

Amazon Web Services, "Amazon ECR User Guide," API Version, Sep. 21, 2015, 101 pages.

R. Mckendrick, "Tools and Processes for Monitoring Containers," The New Stack, https://thenewstack.io/identifying-collecting-container-data/, Dec. 28, 2016, 22 pages.

V. Niculae, "Kemeny—Young Optimal Rank Aggregation in Python," https://vene.ro/blog/kemeny-young-optimal-rank-aggregation-in-python.html, Jan. 22, 2014, 9 pages.

Google Cloud, "Container Registry," https://cloud.google.com/container-registry, Accessed May 5, 2020, 8 pages.

Docker Inc., "Containers," https://hub.docker.com/search?q=&type=image, Accessed May 5, 2020, 8 pages.

\* cited by examiner

| ID | Features | Perception (P or N) | Threshold Limit | Weightage Coefficient (1-10) |
|---|---|---|---|---|
| 1 | Container CPU Utilization (%) | P/N | 80% | 5 |
| 2 | System CPU Utilization (%) | P/N | 90% | 3 |
| 3 | CPU Throttling Count | P/N | 100 | 6 |
| 4 | CPU Throttling Time Count | P/N | 25 | 2 |
| 5 | Memory Utilization (%) | P/N | 90% | 3 |
| 6 | Disc Space Utilization (%) | P/N | 60% | 7 |
| 7 | Memory Fail Instances | P/N | 200 | 6 |
| 8 | Disc I/O Instances | P/N | 500 | 5 |
| 9 | Memory Page Fault Instances | P/N | 300 | 8 |
| 10 | Application Error Events | P/N | 200 | 6 |
| 11 | Security Error Events | P/N | 300 | 6 |
| 12 | System Error Events | P/N | 100 | 5 |
| 13 | Admin Error Events | P/N | 400 | 5 |
| 14 | Diagnostics Error Events | P/N | 200 | 1 |
| 15 | Actionable Functional Events | P | | 2 |
| 16 | Inbound Bytes Received | P | | 2 |
| 17 | Outbound Bytes Received | P | | 3 |
| 18 | Inbound Packets Received | P | | 3 |
| 19 | Outbound Packets Received | P | | 9 |
| 20 | Inbound Packet Errors Received | P/N | 30% | 8 |
| 21 | Outbound Packet Errors Received | P/N | 30% | 9 |
| 22 | Inbound Packet Errors Transmit | P/N | 30% | 9 |
| 23 | Outbound Packet Errors Transmit | P/N | 30% | 6 |
| 24 | Packets Dropped Inbound | P/N | 30% | 4 |
| 25 | Packets Dropped Outbound | P/N | 30% | 2 |

| Index Rank | Container ID |
|---|---|
| 1 | C |
| 2 | H |
| 3 | A |
| 4 | F |
| 5 | E |
| 6 | D |
| 7 | G |
| 8 | B |
| 9 | J |
| 10 | I |

510

| Container ID | Feature ID | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| A | P | P | P | P | P | N | P | P | P | P | N | P | P | P | P | N | P | P | P | P | P | P | P | N | P |
| B | P | P | N | P | N | N | P | P | P | N | P | N | P | P | P | P | N | P | N | P | N | P | P | P | N |
| C | P | P | P | N | P | P | P | P | P | P | N | P | P | P | P | P | P | P | P | P | P | P | P | P | P |
| D | N | P | P | N | P | P | P | P | P | P | N | P | P | P | P | N | P | P | P | P | N | P | N | P | P |
| E | P | P | P | N | P | N | P | N | P | N | P | P | P | N | P | P | N | P | P | P | P | P | P | P | P |
| F | P | N | P | P | P | P | N | P | P | P | P | P | N | N | P | P | P | P | P | P | P | P | P | P | P |
| G | P | P | N | P | N | N | N | P | N | N | P | P | N | P | N | P | N | N | P | P | P | P | P | P | P |
| H | P | P | P | P | N | P | N | N | P | P | P | N | P | N | P | P | N | P | N | P | P | P | P | P | P |
| I | P | P | N | P | P | N | N | N | P | P | P | P | P | P | P | P | P | P | N | P | N | P | N | P | P |
| J | P | P | N | N | P | P | N | N | P | P | N | P | P | P | N | N | P | P | P | P | P | P | P | P | N |

| Container ID | Rank | | | | | | | | | | Final Ranking Score |
|---|---|---|---|---|---|---|---|---|---|---|---|
| | 1 | 2 | 3 | 4 | 5 | 6 | 7 | 8 | 9 | 10 | |
| | A | B | C | D | E | F | G | H | I | J | 20 |
| | B | A | C | D | F | E | G | H | I | J | 34 |
| | E | B | C | D | A | F | G | H | I | J | 23 |
| | A | B | C | D | E | F | G | H | I | J | 56 |
| | D | B | C | A | G | F | E | H | I | J | 34 |
| | A | B | C | D | A | F | G | H | I | J | 54 |
| | C | B | A | D | E | F | G | H | I | J | 87 |
| | H | B | C | D | E | F | G | A | I | J | 65 |
| | D | B | C | A | E | F | A | H | C | J | 45 |
| | A | B | I | D | F | E | G | H | I | J | 35 |
| | D | E | G | A | B | F | C | H | I | J | 45 |

FIG. 7

```
from __future__ import print_function
from itertools import combinations, permutations
import numpy as np ''' Columns representing various container images being ranked. '''
cols = "A B C D E".split()

''' Sample historical rankings data, where 1st array element represents current intermediate ranking. '''
ranks = np.array([[0, 1, 2, 3, 4], [2, 3, 0, 1, 4], [0, 3, 2, 1, 4], [4, 1, 2, 3, 0], [0, 3, 2, 4, 1], [3, 1, 2, 1, 4], [1, 2, 0, 3, 4],
                  [3, 1, 0, 2, 4], [0, 1, 4, 3, 2], [4, 1, 2, 3, 0], [3, 1, 2, 0, 4], [2, 1, 0, 4, 3], [1, 3, 2, 0, 4], [3, 1, 2, 0, 4]])

''' Distance metric function to measure pairwise disagreements in various rankings. '''
def kendall_tau_distance(rank_a, rank_b):
    distance = 0
    n_candidates = len(rank_a)
    for i, j in combinations(range(n_candidates), 2):
        distance += (np.sign(rank_a[i] - rank_a[j]) == -np.sign(rank_b[i] - rank_b[j]))
    return distance
```

```
''' Implements consensus driven optimal rank aggregation model which returns the best scoring ranking. '''
def optimal_rank_aggregation(ranks):
    minimum_distance = np.inf
    most_optimal_rank = None
    n_voters, n_candidates = ranks.shape
    for candidate_rank in permutations(range(n_candidates)):
        dist = np.sum(kendall_tau_distance(candidate_rank, rank) for rank in ranks)
        if dist < minimum_distance:
            minimum_distance = dist
            most_optimal_rank = candidate_rank
    return minimum_distance, most_optimal_rank distance, aggregate = optimal_rank_aggregation(ranks)
print("")
print("Best Scoring Ranking with score {} is: {}".format(distance, ", ".join(cols[i] for i in np.argsort(aggregate))))
```

```
from __future__ import print_function
from itertools import combinations, permutations
from lp_solve import lp_solve
import numpy as np ''' Columns representing various container images being ranked. '''
cols = "A B C D E F G H I J".split()

''' Sample historical rankings data. The first array element represents the current intermediate ranking'''
ranks = np.array([[0, 1, 2, 3, 4, 5, 6, 7, 8, 9], [0, 1, 2, 3, 4, 5, 6, 7, 8, 9], [0, 1, 2, 3, 4, 5, 6, 7, 8, 9],
                  [0, 1, 2, 3, 4, 5, 6, 7, 8, 9], [0, 1, 2, 3, 4, 5, 6, 7, 8, 9], [0, 1, 2, 3, 4, 5, 6, 7, 8, 9],
                  [0, 1, 2, 3, 4, 5, 6, 7, 8, 9], [0, 1, 2, 3, 4, 5, 6, 7, 8, 9], [0, 1, 2, 3, 4, 5, 6, 7, 8, 9],
                  [0, 1, 2, 3, 4, 5, 6, 7, 8, 9], [0, 1, 2, 3, 4, 5, 6, 7, 8, 9], [0, 1, 2, 3, 4, 5, 6, 7, 8, 9],
                  [0, 1, 2, 3, 4, 5, 6, 7, 8, 9], [0, 1, 2, 3, 4, 5, 6, 7, 8, 9], [0, 1, 2, 3, 4, 5, 6, 7, 8, 9],
                  [0, 1, 2, 3, 4, 5, 6, 7, 8, 9]])
```

```
''' Distance metric function to measure pairwise disagreements in various rankings. '''
def kendall_tau_distance(rank_a, rank_b):
    distance = 0
    n_candidates = len(rank_a)
    for i, j in combinations(range(n_candidates), 2):
        distance += (np.sign(rank_a[i] - rank_a[j]) == -np.sign(rank_b[i] - rank_b[j]))
    return distance def optimal_rank_aggregation_graph(ranks):
    n_voters, n_candidates = ranks.shape
    edge_weights = np.zeros((n_candidates, n_candidates))
    for i, j in combinations(range(n_candidates), 2):
        preference = ranks[:, i] - ranks[:, j]
        h_ij = np.sum(preference < 0)
        h_ji = np.sum(preference > 0)
        if h_ij > h_ji:
            edge_weights[i, j] = h_ij - h_ji
        elif h_ij < h_ji:
            edge_weights[j, i] = h_ji - h_ij
    return edge_weights print(optimal_rank_aggregation_graph(ranks))
```

SOFTWARE CONTAINER IMAGE QUALITY RANKING BASED ON PERFORMANCE OF INSTANCES OF THE SOFTWARE CONTAINER IMAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for software container image quality ranking based on performance of software container instances of the software container images.

In one embodiment, an apparatus comprises at least one processing device comprising a processor coupled to a memory. The at least one processing device is configured to perform the step of obtaining metrics characterizing performance, over two or more periods of time, of software container instances of each of a plurality of software container images. The at least one processing device is also configured to perform the step of determining, for each of the two or more periods of time, a periodic quality ranking of the plurality of software container images based at least in part on the obtained metrics. The at least one processing device is further configured to perform the steps of generating an overall quality ranking of the plurality of software container images utilizing a consensus ranking aggregation algorithm configured to aggregate the periodic quality rankings of the plurality of software container images across the two or more periods of time, and publishing the overall quality ranking of the plurality of software container images to a software container registry.

These and other illustrative embodiments include, without limitation, methods, apparatus, networks, systems and processor-readable storage media.

BRIEF DESCRIPTION OF THE DRAWINGS

FIG. 4 shows a table of software container features used for ranking in an illustrative embodiment.

FIG. 5 shows tables for use in generating a software container ranking report in an illustrative embodiment.

FIG. 7 shows a table of software container rankings in an illustrative embodiment.

FIGS. 8A and 8B show pseudocode for implementing a consensus driven rank aggregation model for software container ranking in an illustrative embodiment.

FIGS. 9A and 9B show pseudocode for implementing another consensus driven rank aggregation model for software container ranking in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
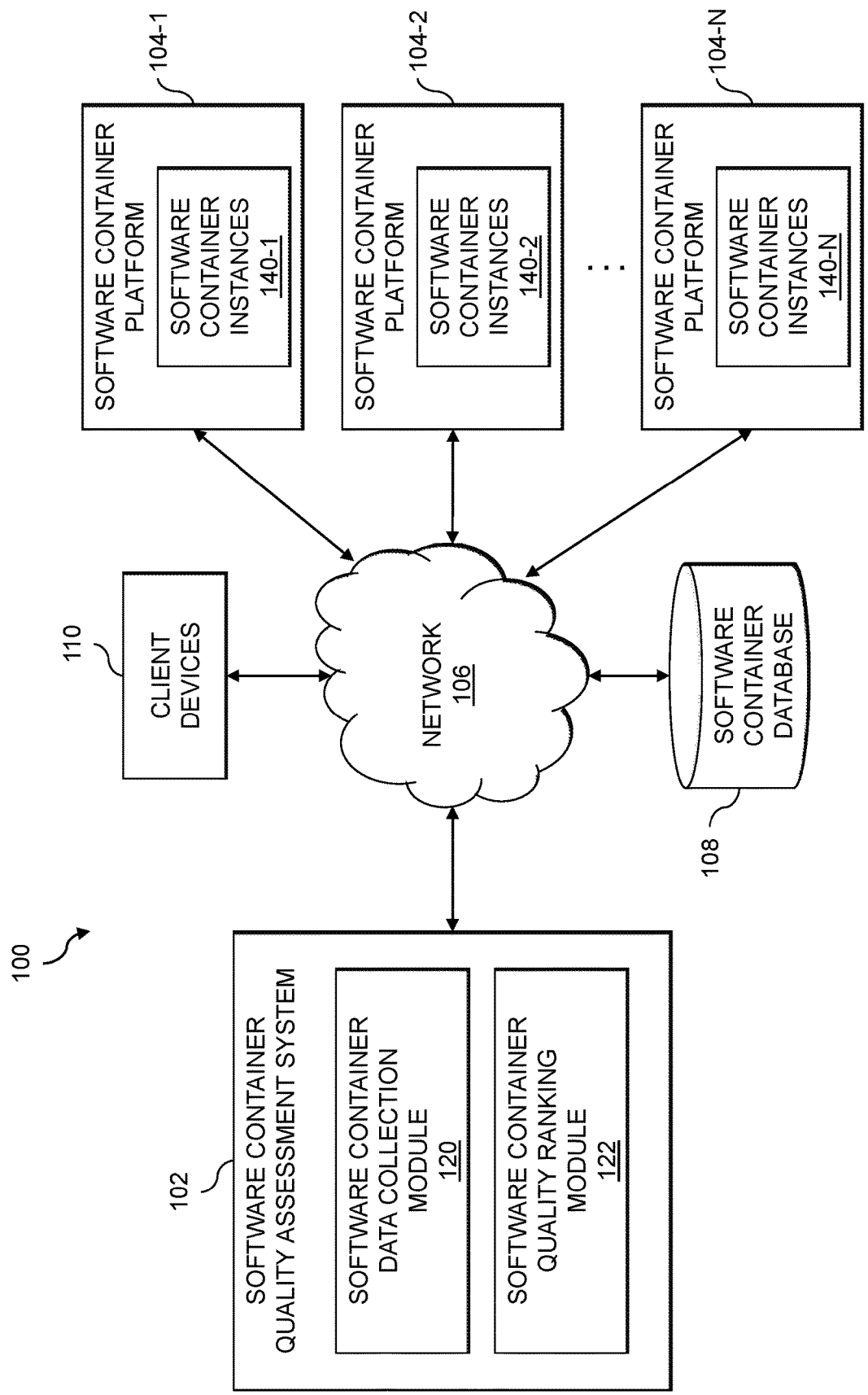
FIG. 1 is a block diagram of an information processing system for software container image quality ranking based on performance of software container instances of the software container images in an illustrative embodiment.

FIG. 1 shows an information processing system 100 configured in accordance with an illustrative embodiment. The information processing system 100 is assumed to be built on at least one processing platform and provides functionality for software container image quality ranking using software container quality assessment system 102. The software containers, also referred to herein as containers, are assumed to be implemented by a set of software container platforms 104-1, 104-2, . . . 104-N (collectively, software container platforms 104). In some embodiments, the software container platforms 104 are geographically distributed. The software container platforms 104 may also be cloud-based. The software container quality assessment system 102 and software container platforms 104 are coupled to a network 106. Also coupled to the network 106 is a software container database 108 (e.g., which may implement a software container registry and a software container metrics data store) and one or more client devices 110.

Users or clients provide requests to the software container platforms 104 via the client devices 110. Each of the software container platforms 104 may implement a container orchestration engine that receives such requests from the client devices 110 to execute or access software containers hosted on the software container platforms 104, and the software container platforms 104 run respective software container instances 140-1, 140-2, . . . 140-N (collectively, software container instances 140) as requested by the client devices 110. In some cases, software container instances may also be run on one or more of the client devices 110.

The client devices 110 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 110 may also or alternately comprise virtualized computing resources, such as virtual machines (VMs), software containers, etc.

The client devices 110 in some embodiments comprise respective computers associated with a particular company, organization or other enterprise. The software container instances 140 running on the software container platforms 104 may also be associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The software container database 108 is configured to store and record various information relating to software containers, such as various features and other metrics characterizing software container quality. In some embodiments, as noted above, the software container database 108 implements a software container registry (e.g., used by the client devices 110 to view available software container images that may be executed on the software container platforms 104) and a software container metric data store (e.g., that stores software container performance metrics for software container instances 140 of the software container images).

The software container database 108 in some embodiments is implemented using one or more storage systems or devices associated with one or more of the software container platforms 104. In some embodiments, one or more of the storage systems utilized to implement the software container database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software container quality assessment system 102, the software container platforms 104, the software container database 108 and the client devices 110, as well as to support communication between the software container quality assessment system 102, the software container platforms 104, the software container database 108, the client devices 110 and other related systems and devices not explicitly shown.

In some embodiments, the client devices 110 may implement host agents that are configured for communication with the software container quality assessment system 102, the software container platforms 104, and the software container database 108. The software container quality assessment system 102, as will be described in further detail below, is configured to analyze performance of software containers and to generate software container quality rankings. The host agents implemented by the client devices 110 may be configured to receive notifications or alerts when the software container quality rankings are published, updated or otherwise made available. In other embodiments, such notifications and alerts may alternatively or further be provided to a system administrator, information technology (IT) personnel or other users that are responsible for managing the software container platforms 104 or a set of the software container instances 140 associated with a particular enterprise or other entity.

It should be noted that a "host agent" as this term is generally used herein may comprise an automated entity, such as a software entity running on a processing device. Accordingly, a host agent need not be a human entity.

Although the software container quality assessment system 102 is shown as a separate element in FIG. 1 (e.g., as a standalone server, set of servers or other type of system coupled to the network 106), in other embodiments the software quality assessment system 102 may be implemented at least in part internally to one or more of the software container platforms 104, to one or more of the client devices 110, etc.

The software container quality assessment system 102 in the FIG. 1 embodiment is assumed to be implemented using at least one processing device. Each such processing device generally comprises at least one processor and an associated memory, and implements one or more functional modules for controlling certain features of the software container quality assessment system 102. In the FIG. 1 embodiment, the software container quality assessment system 102 comprises a software container data collection module 120 and a software container quality ranking module 122.

The software container data collection module 120 is configured to obtain metrics characterizing performance, over two or more periods of time, of the software container instances 140 running on the software container platforms 104. Such software container instances 140 may be associated with different ones of a plurality of software container images. The metrics for all of the software container instances 140 associated with a particular software container image are aggregated by the software container data collection module 120, and are used to determine a periodic quality ranking of that software container image for each of two or more periods of time (e.g., for a current time period and one or more historical time periods prior to the current time period). In some embodiments, each time period is a day.

The software container quality ranking module 122 is configured to generate an overall quality ranking of the plurality of software container images utilizing a consensus ranking aggregation algorithm (e.g., a Kemeny-Young method) that is configured to aggregate the periodic quality rankings of the plurality of software container images across the two or more periods of time. The software container quality ranking module 122 is also configured to publish the overall quality ranking of the plurality of software container images to a software container registry (e.g., in the software container database 108).

It should be appreciated that the modules 120 and 122 may continually perform the above-described functionality. For example, the software container quality rankings may be periodically updated and pushed out to users (e.g., of the client devices 110) based on updated software container performance metrics collected from the running software container instances 140 on the software container platforms 104.

It is to be appreciated that the particular arrangement of the software container quality assessment system 102, the software container data collection module 120 and the software container quality ranking module 122 illustrated in the FIG. 1 embodiment is presented by way of example only, and alternative arrangements can be used in other embodiments. As discussed above, for example, the software container quality assessment system 102, the software container data collection module 120, and the software container quality ranking module 122 may in some embodiments be implemented internal to one or more of the client devices 110 or one or more of the software container platforms 104. As another example, the functionality associated with the software container data collection module 120 and the software container quality ranking module 122 may be combined into one module, or separated across more than two modules with the multiple modules possibly being implemented with multiple distinct processors or processing devices.

At least portions of the software container data collection module 120 and the software container quality ranking module 122 may be implemented at least in part in the form of software that is stored in memory and executed by a processor.

It is to be understood that the particular set of elements shown in FIG. 1 for software container image quality ranking is presented by way of illustrative example only, and in other embodiments additional or alternative elements may be used. Thus, another embodiment may include additional or alternative systems, devices and other network entities, as well as different arrangements of modules and other components.

By way of example, in other embodiments, the software container quality assessment system 102 may be implemented on one or more of the software container platforms 104 or client devices 110. In some embodiments, the client devices 110 may run one or more of the software container instances 140 rather than the software container instances 140 being run on external software container platforms 104.

The software container quality assessment system 102, the software container platforms 104, the software container database 108 and the client devices 110, in some embodiments, may be part of cloud infrastructure as will be described in further detail below.

The software container quality assessment system 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The software container quality assessment system 102, the software container platforms 104, the software container database 108, and the client devices 110, or components thereof, may be implemented on respective distinct processing platforms, although numerous other arrangements are possible. For example, in some embodiments at least portions of the software container quality assessment system 102 and one or more of the software container platforms 104, the software container database 108, and the client devices 110 are implemented on the same processing platform. A given one of the client devices 110, for example, can therefore be implemented at least in part within at least one processing platform that implements at least a portion of the software container quality assessment system 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the software container quality assessment system 102, the software container platforms 104, the software container database 108 and the client devices 110, or portions or components thereof, to reside in different data centers. For example, as noted above, in some embodiments the software container platforms 104 are geographically distributed. Numerous other distributed implementations are possible. The software container quality assessment system 102, or portions thereof, can also be implemented in a distributed manner across multiple data centers.

Additional examples of processing platforms utilized to implement the software container quality assessment system 102 and other portions of the system 100 in illustrative embodiments will be described in more detail below in conjunction with FIGS. 10 and 11.

It is to be appreciated that these and other features of illustrative embodiments are presented by way of example only, and should not be construed as limiting in any way.

An exemplary process for software container image quality ranking will now be described in more detail with reference to the flow diagram of FIG. 2. It is to be understood that this particular process is only an example, and that additional or alternative processes for software container image quality ranking may be used in other embodiments.

In this embodiment, the process includes steps 200 through 206. These steps are assumed to be performed by the software container quality assessment system 102 utilizing the software container data collection module 120 and the software container quality ranking module 122. The process begins with step 200, obtaining metrics characterizing performance, over two or more periods of time, of software container instances of each of a plurality of software container images. In step 202, a periodic quality ranking of the plurality of software container images is determined for each of the two or more periods of time based at least in part on the obtained metrics.

Determining a given one of the periodic quality rankings of the plurality of software container images for a given one of the two or more periods of time may comprise extracting a set of features from the obtained metrics, each of the set of features being associated with a perception and a weight coefficient, and calculating a ranking for a given software container image as a weighted sum of the perceptions for the set of features. The set of features comprises a first subset of features characterizing relative functional performance of the software container instances and a second subset of features characterizing normal functional activity, the second subset of features being utilized to offset rankings of non-active software container instances at the expense of active software container instances.

Figure 2:
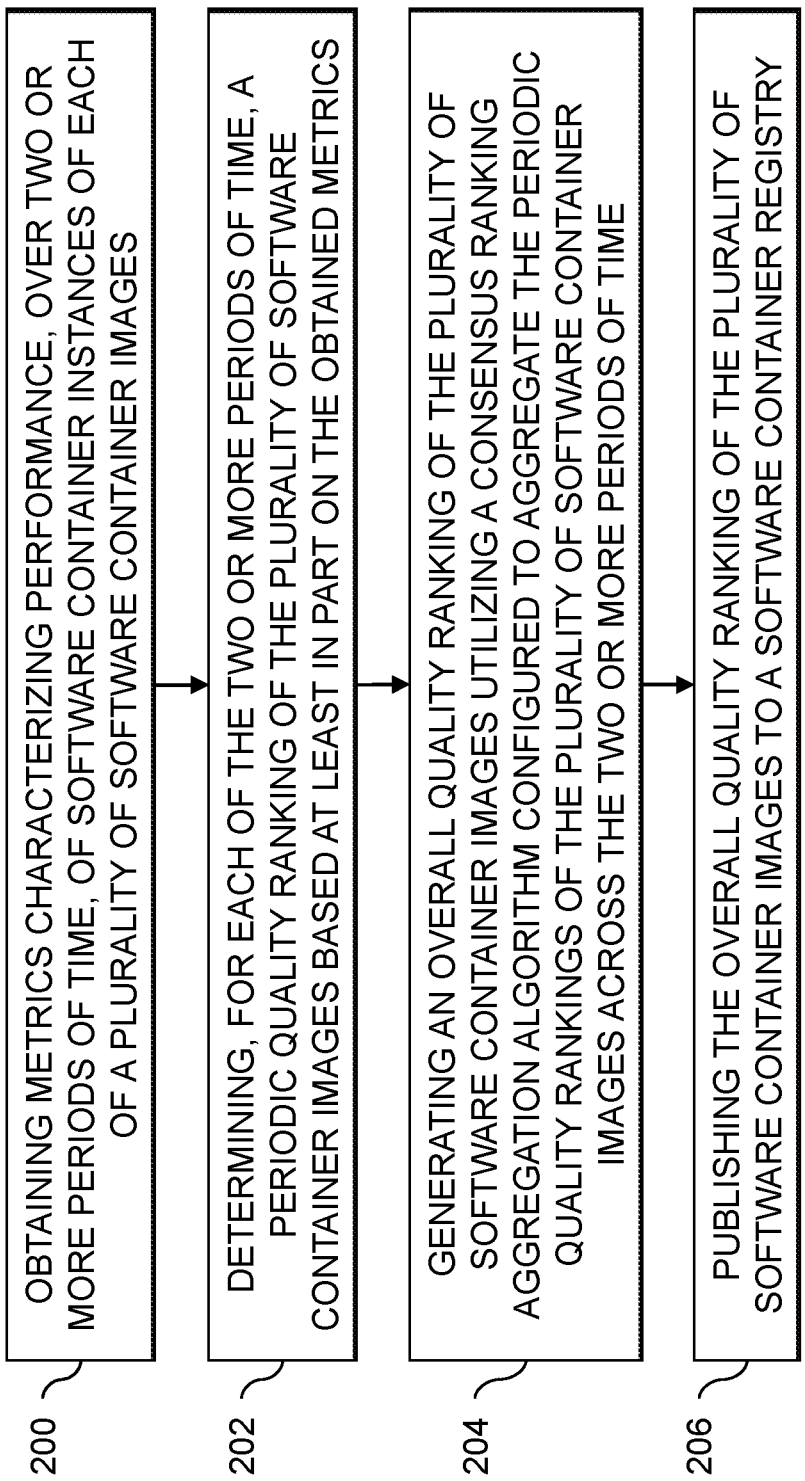
FIG. 2 is a flow diagram of an exemplary process for software container image quality ranking based on performance of software container instances of the software container images in an illustrative embodiment.

The FIG. 2 process continues with step 204, generating an overall quality ranking of the plurality of software container images utilizing a consensus ranking aggregation algorithm configured to aggregate the periodic quality rankings of the plurality of software container images across the two or more periods of time. The two or more periods of time may comprise a current time period and one or more historical time periods prior to the current time period. The consensus ranking aggregation algorithm may reward consistent ranking values across the periodic quality rankings for the current time period and the one or more historical time periods (e.g., rewards consistent good performance, penalizes consistent bad performance). In this way, the overall ranking may gradually change as the consensus ranking aggregation algorithm takes into account not only the current ranking or perception of the quality of the plurality of software container images (e.g., for a present or most recent day) but also the historical ranking or perception of the quality of the plurality of software container images (e.g., for the last week, month, etc.). The consensus ranking aggregation algorithm utilized in step 204 may comprise a Kemeny-Young model. The Kemeny-Young model may calculate a score for each quality ranking combination of the plurality of software container images. The score for a given quality ranking combination is based at least in part on a distance metric function that measures pairwise disagreements between ranking values of the plurality of software container images in different ones of the periodic quality rankings. One of the quality ranking combinations is selected as the overall quality ranking based at least in part on the calculated scores (e.g., the quality ranking combination with the highest score may be selected as the overall quality ranking). In some embodiments, calculating the score for each ranking combination utilizes a brute force approach, where the distance metric function comprises a Kendall tau rank distance metric that counts a number of pairwise disagreements in ranking values of the plurality of software container images between two of the periodic quality rankings.

In other embodiments, calculating the score for each ranking combination utilizes a weighted graph-based approach, such as an integer programming formulation. The weighted graph-based approach may comprise modeling the periodic quality rankings as a weighted directed graph wherein each vertex of the weighted directed graph represents one of the plurality of software container images, and wherein a given edge connecting a first one of the vertices representing a first one of the plurality of software container images and a second one of the vertices representing a second one of the plurality of software container images comprises (i) a weight representing a number of the periodic quality rankings that rank the first software container image higher than the second software container image and (ii) an orientation from the lower-ranked one of the first software container image and the second software container image to the higher-ranked one of the first software container image and the second software container image. Selecting one of the quality ranking combinations as the overall quality ranking based at least in part on the calculated scores may comprise selecting a given quality ranking in the weighted directed graph that minimizes the weights of the edges that the given quality ranking disagrees with.

The FIG. 2 process concludes in step 206 with publishing the overall quality ranking of the plurality of software container images to a software container registry. Step 206 may comprise associating individual quality rankings of each of the plurality of software container images from the overall quality ranking with corresponding entries in a catalog of software container images hosted by the software container registry.

Step 206 may further comprise, responsive to a request to view a given entry in the catalog of software container images corresponding to a given one of the plurality of software container images, displaying the individual ranking from the overall quality ranking associated with the given software container image. For example, a user (e.g., of one of the client devices 110) may access the software container registry to view available software container images from a catalog. When selecting a particular software container image from the catalog, its associated individual ranking may be displayed (e.g., next to a title or description of the software container image, where the individual ranking may indicate a number such as 1, a number out of another number such as 1 out of 100, a percentile such as top 1% ranking, a numerical index ranking converted to another form such as a letter grade, etc.).

Step 206 may also comprise, responsive to a request to view two or more entries in the catalog of software container images corresponding to two or more of the plurality of software container images, sorting a display of the two or more entries based on the individual quality rankings from the overall quality ranking associated with the two or more software container images. For example, a user (e.g., of one of the client devices 110) may access the software container registry to view available software container images from a catalog, where the entries of the catalog are sorted based on the individual quality rankings from the overall quality rankings. Alternatively, a user may submit a query to the catalog to return software container images meeting search criteria (e.g., one or more keywords, designated software container image types, etc.) with the search results being sorted based at least in part on the individual quality rankings from the overall quality rankings.

Step 206 may also include utilizing the overall quality rankings to filter a catalog of software container images. For example, a user (e.g., of one of the client devices 110) may access the catalog of the software container registry and specify that only software container images having a ranking within some designated range be displayed. The designated range may specify, for example, a particular number of software container images in each of a set of software container image categories (e.g., providing different types of functionality).

Step 206 may further include automatically selecting and downloading or executing instances of software container images based at least in part on the overall quality rankings. For example, a user (e.g., of one of the client devices 110)

may submit a request to a software container registry for a software container to perform some desired functionality, and the software container registry may provide in return to the user the highest-ranked software container image providing the desired functionality. Providing the highest-ranked software container image, in some embodiments, includes automatically executing or running an instance of the software container image on one or more software container host devices (e.g., on the client device 110 utilized by the user, on one of the software container platforms 104, etc.).

The core efficacy of any software container registry platform depends on its ability to distribute reliable, stable and trustworthy software container images. Enterprises and customers re-use the software container images to create software container instances and include them in an associated enterprise ecosystem (e.g., as "first-class" or trusted citizens in the associated ecosystem). Apart from the great value in re-using existing software container images, the use of software container images comes with known vulnerabilities and unknown issues which can create problems in a host application production environment.

Software container quality assurance mechanisms may have various limitations and gaps. In some cases, trustworthy software container images (e.g., software container images that are Docker Certified, Official Images, Verified Publisher, etc.) provide some level of stability and bug-free assurance. It is further assumed that trustworthy software container images have been scanned for vulnerabilities. Such assumptions, however, may be based primarily or solely on brand, pedigree and trust. This, however, is not sufficient for ensuring quality. Also, many software container images are third-party developed and owned, but are hosted on various software container registries (e.g., Docker Hub, Amazon Elastic Container Registry (ECR), Google Container Registry, etc.). Thus, there is a need for effective mechanisms to assess the quality of software container images based on actual performance of instances thereof in the field. Such techniques are needed to enable prospective users to make informed decisions on usage of the software container images in an associated information technology (IT) infrastructure or system.

As mentioned above, some software container registries provide snapshots of software container images which may be labeled as "Verified Publisher" or "Official Image." In such instances, however, there is no way for an enterprise user to assess the quality of the software container images apart from relying on the trustworthiness of the operator of the software container registry that provides such labels. In addition, certain established brands that publish software container images to a software container registry may provide some level of quality assurance. However, even well-established brands may have software container images with various vulnerabilities. These issues are exacerbated when considering "unknown" publishers, where a user cannot rely on the brand or labels applied by the software container registry. Illustrative embodiments provide techniques for measuring the quality of software container images and for providing quality rankings or other metrics to enable users to make informed selection of software container images for use.

In some embodiments, software container image quality rankings are generated based at least in part on the current and past historical performance of instances of the software container images in the field. The software container image quality rankings are utilizable by potential users for assessing software container image health before deciding to integrate instances of the software container images in enterprise or other IT systems. To begin, the software container quality assessment system 102 (e.g., using the software container data collection module 120) collects performance metrics or features from running software container instances in the field. Using the collected performance metrics or features, the software container quality assessment system 102 builds a perception on how a software container image is performing on certain parameters. In some embodiments, the assessment for each parameter is either positive or negative, depending on some predefined threshold limit. The software container quality assessment system 102 (e.g., using the software container quality ranking module 122) builds a current ranking report (e.g., a daily ranking report) based at least in part on the software container performance quality. The daily or other current ranking report is utilized, along with past historical ranking reports, to build a quality index ranking using a consensus-based optimal rank aggregation algorithm. In some embodiments, the consensus-based optimal rank aggregation algorithm utilizes the Kemeny-Young method. Software container quality rankings are released periodically (e.g., daily, on request by one or more of the client devices 110, etc.). In some embodiments, the software container quality rankings are released to software container image repositories daily, where users of the software container image repositories (e.g., customers, enterprises, companies, etc.) can use the software container quality rankings and associated performance metrics to intelligently assess the quality of software container images and make informed decisions as to whether and how to use the software container images.

Figure 3A:
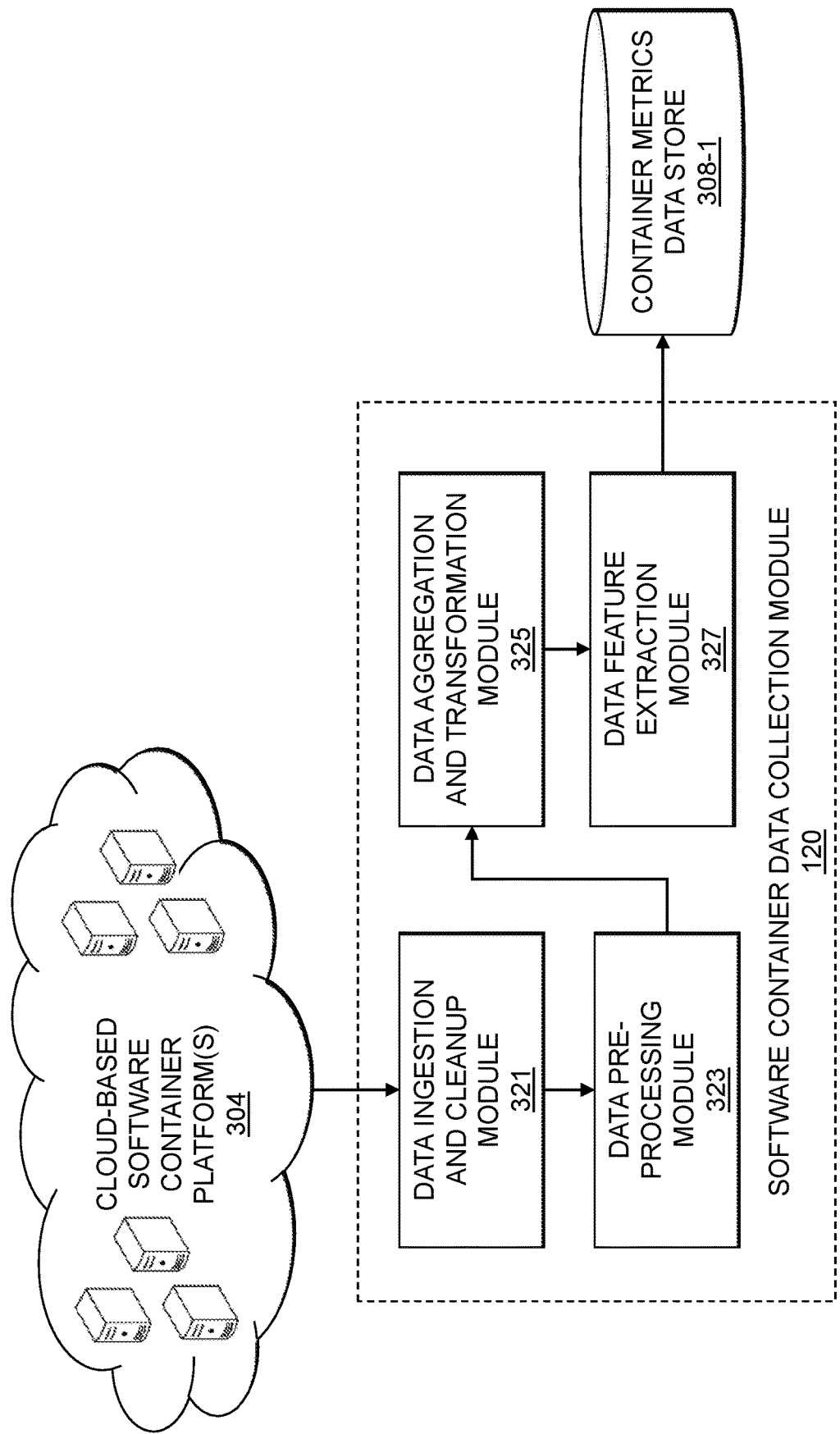
FIGS. 3A and 3B show a system flow for software container ranking in an illustrative embodiment.
Figure 3B:
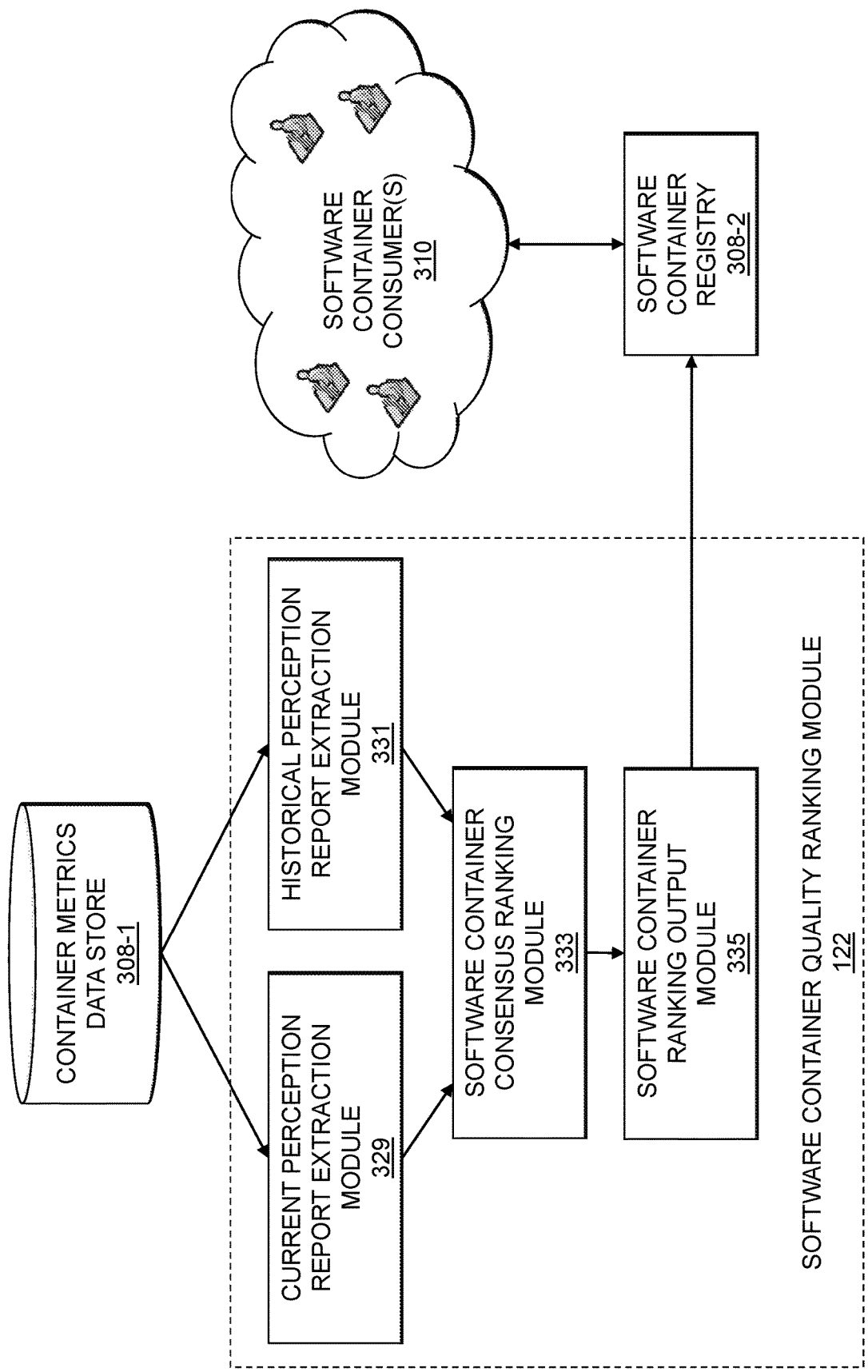

FIGS. 3A and 3B show a system flow for software container quality ranking utilizing the software container data collection module 120 and the software container quality ranking module 122. As shown in FIG. 3A, the software container data collection module 120 collects performance and event metrics for software container instances running in one or more cloud-based software container platforms 304, which are examples of the software container platforms 104 described above. To collect such metrics, various container monitoring tools and systems may be utilized on the cloud-based, traditional or self-hosted container infrastructures on which software container instances run. Examples of such tools include Prometheus, cAdvisor, Agentless System Crawler, Sysdig, Dynatrace, Datadog, etc. These and other tools may be used in some embodiments for data collection.

The software container data collection module 120 implements a data ingestion and cleanup module 321, data pre-processing module 323, data aggregation and transformation module 325, and a data feature extraction module 327. The data ingestion and cleanup module 321 receives the collected data from the cloud-based software container platforms 304. The data ingestion and cleanup module 321 provides the collected data to the data pre-processing module 323, which performs various data clean-up tasks (e.g., removing dirty, duplicate or stale data). The cleaned-up data is provided to the data aggregation and transformation module 325 which aggregates and transforms the cleaned-up data into a format described in further detail below. The data feature extraction module 327 extracts relevant or desired features from the aggregated and transformed data. The extracted features are stored in a software container metrics data store 308-1 (e.g., which may be implemented by the software container database 108).

FIG. 3B shows the software container quality ranking module 122 implementing a current perception report extraction module 329, a historical perception report extraction module 331, a software container consensus ranking module 333, and a software container ranking output module 335. The current perception report extraction module 329 and the historical report extraction module 331 utilize the feature data stored in the software container metrics data store 308-1 to build current and past or historical ranking lists of software container images, respectively. The software container consensus ranking module 333 builds a final ranking using the current and historical ranking lists by utilizing an optimal rank aggregation algorithm, such as the Kemeny-Young method. The software container ranking output module 335 provides the final ranking to a software container registry 308-2 (e.g., which may be implemented by the software container database 108). The final ranking may be issued or published to the software container registry 308-2 periodically (e.g., daily). Software container consumers 310 (e.g., utilizing client devices 110) can access the software container registry 308-2 to get the latest software container rankings and make informed decisions regarding software container selection.

Figure 6:
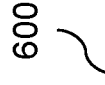
FIG. 6 shows a table of sample feature data for software container rankings in an illustrative embodiment.

As described above, the software container data collection module 120 is configured to collect various metrics from software container instances of a given software container image on a routine basis to generate current quality perception rankings (e.g., daily perception rankings for different software container images). The quality perception may be based on a number of features using various logic. Features that have some defined or associated threshold may be judged as positive or negative based on whether that feature has reached or exceeded that threshold limit. For example, features such as error events, throttling count, utilization, etc., may be judged as positive or negative based on specified thresholds. Features that do not have a defined or associated threshold may be judged as positive, or not judged at all. Such features may represent normal functional activity, and are taken into consideration to offset ranking of non-active software containers at the expense of active software containers. FIG. 4 shows a table 400 illustrating an example set of metrics or features, where each feature or metric has an identifier (ID), a description, a perception value (e.g., positive (P) or negative (N) for features with associated thresholds, P or blank for features without associated thresholds as noted above), threshold limits (where applicable), and weightage coefficient. FIG. 5 shows a first table 500 of a current (e.g., daily) perception for a set of software container images with associated IDs A-J, along with the feature values for the feature IDs 1-25 shown in table 400 of FIG. 4. FIG. 5 shows a second table 510 with a sample current (e.g., daily) ranking of the software container images A-J in the daily perception table 500. FIG. 6 shows a table 600 with sample feature data used to generate the table 500 (e.g., specific feature values that may be converted to "P" or "N" when generating a current perception). The daily ranking table 510 is a relative ranking of the software container images currently published on a software container registry platform.

FIG. 7 shows a table 700 of final rankings generated using a consensus ranking algorithm. In some embodiments, the Kemeny-Young method is utilized as the consensus ranking algorithm. To do so, a matrix is created which counts software container pairwise feature perception. A positive perception grants 1 vote, and a negative or tie perception is not counted and does not impact the final score. The Kemeny-Young method then analyzes all possible ranking combinations and calculates a score for each ranking combination. The ranking with the maximum score is identified as the final ranking. In the table 700, the ranking highlighted in gray with the highest final ranking score (e.g., 87) is selected as the final current (e.g., daily) ranking.

The Kemeny-Young method is considered NP hard when a brute force approach is used to rank a large set, as the complexity grows factorially (e.g., n!, where n is the number of software container images to be ranked). Thus, depending on the number of software container images to be ranked, the brute force approach for implementing the Kemeny-Young method may not be computationally feasible given available computing resources. As an alternative, some embodiments implement the Kemeny-Young method using an integer programming formulation, which solves the problem in a way that is not computationally expensive and thus is suitable for handling large data sets. The integer programming formulation follows a graph theoretic approach, where the rankings are modeled as a weighted directed graph with entities (e.g., the software container images being ranked) as "vertices" and with "edges" between entities being defined with weights. For example, the weight for the edge between vertices representing entities E1 and E2 corresponds to the number of up-votes which rank E1 higher than E2, with the orientation of the edge being from the lower ranked node to the higher ranked node. The final ranking is selected as the ranking that minimizes the weights of the edges it disagrees with.

FIGS. 8A and 8B show pseudocode 800-1 and 800-2 (collectively, pseudocode 800) for implementing a consensus driven rank aggregation model for software container ranking using the Kemeny-Young method with a brute force approach. More particularly, the pseudocode 800 illustrates the generation of a software container quality index ranking for 5 different software container images (e.g., denoted as A, B, C, D and E). The pseudocode 800 utilizes an array "ranks" which represents the current daily rankings, as well as past historical daily rankings. The pseudocode 800 utilizes a distance metric function to measure pairwise disagreements in the different daily rankings. More specifically, the pseudocode 800 calculates Kendall tau rank distance metrics, which count the number of pairwise disagreements between the different daily rankings (e.g., where the larger the distance, the more dissimilar two daily rankings are). Based on the sample data, the best scoring ranking (with a score of 50) is the ranking: B, C, D, A, E.

FIGS. 9A and 9B show pseudocode 900-1 and 900-2 (collectively, pseudocode 900) for implementing a consensus driven rank aggregation model for software container ranking using the Kemeny-Young method with a graph-based or integer programming formulation approach. The pseudocode 900 illustrates the generation of a software container quality index ranking for 10 different software container images (e.g., denoted as A, B, C, D, E, F, G, H, I, J). The pseudocode 900 utilizes an array "ranks" which represents the current daily rankings, as well as past historical rankings. In this example, the current and historical rankings are all the same and thus the best scoring ranking is simply A, B, C, D, E, F, G, H, I, J. As detailed above with respect to FIGS. 4-7, however, different current and historical rankings may result in a different final ranking for software container images A through J.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for software container image quality ranking will now be described in greater detail with reference to FIGS. 10 and 11. Although described in the context of system 100, these platforms may also be used to implement at least portions of other information processing systems in other embodiments.

Figure 10:
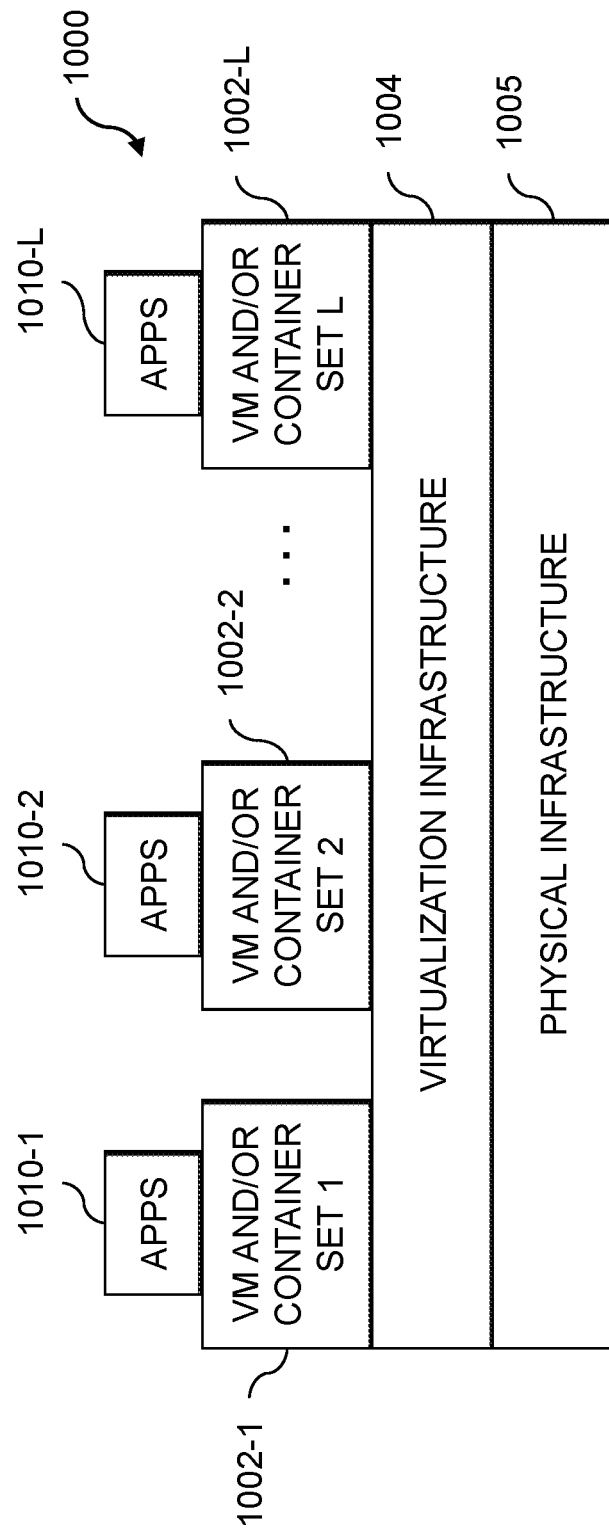
FIGS. 10 and 11 show examples of processing platforms that may be utilized to implement at least a portion of an information processing system in illustrative embodiments.
Figure 11:
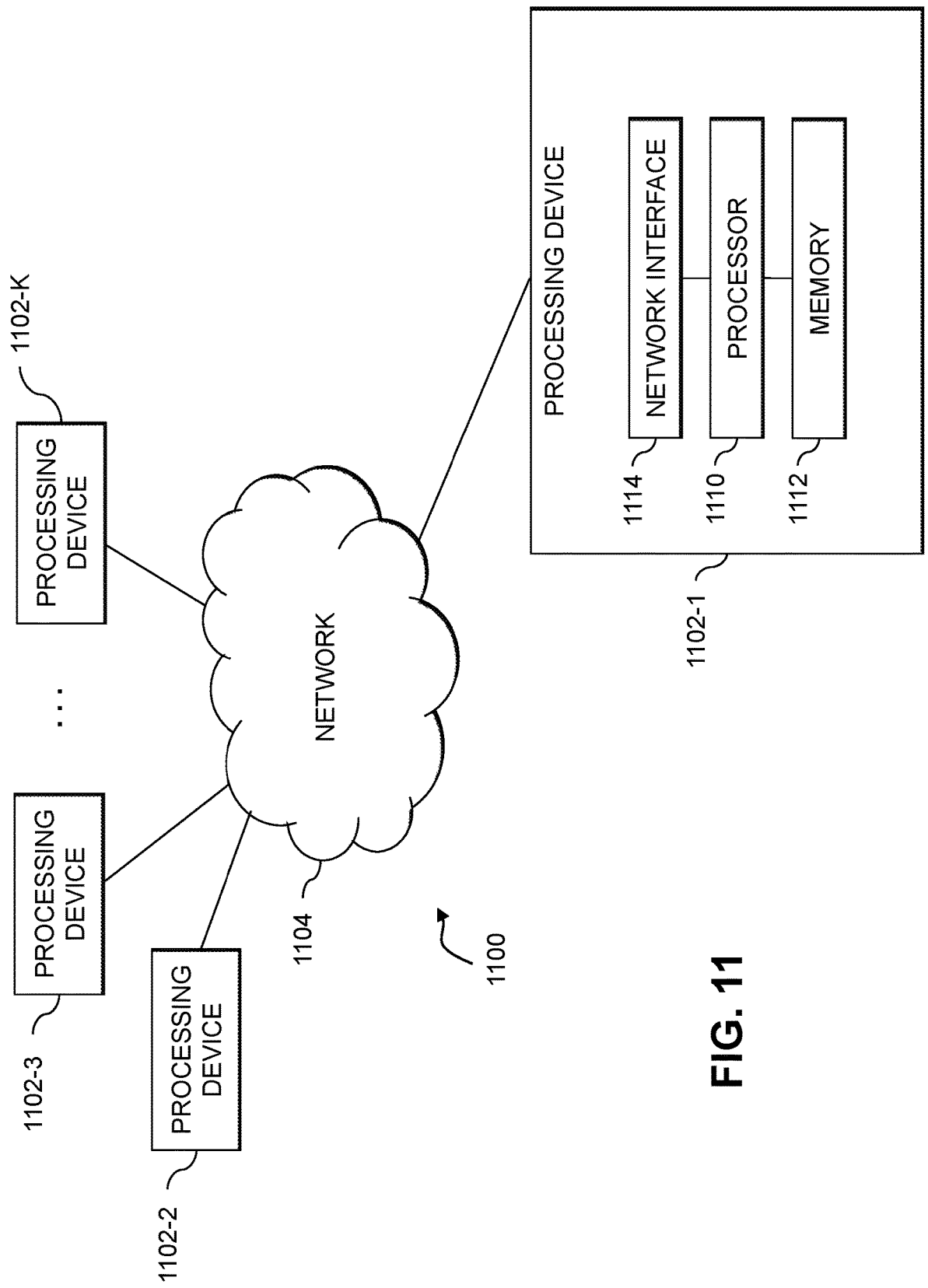

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple VMs and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for software container image quality ranking as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software container platforms, consensus ranking aggregation algorithms, distance metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining metrics characterizing performance, over two or more periods of time, of software container instances of each of a plurality of software container images;
   determining, for each of the two or more periods of time, a periodic quality ranking of the plurality of software container images based at least in part on the obtained metrics;
   generating an overall quality ranking of the plurality of software container images utilizing a consensus ranking aggregation algorithm configured to aggregate the periodic quality rankings of the plurality of software container images across the two or more periods of time; and
   publishing the overall quality ranking of the plurality of software container images to a software container registry.

2. The apparatus of claim 1 wherein determining a given one of the periodic quality rankings of the plurality of software container images for a given one of the two or more periods of time comprises:
   extracting a set of features from the obtained metrics, each of the set of features being associated with a perception and a weight coefficient; and
   calculating a ranking for a given software container image as a weighted sum of the perceptions for the set of features.

3. The apparatus of claim 2 wherein the set of features comprises a first subset of features characterizing relative functional performance of the software container instances and a second subset of features characterizing normal functional activity, the second subset of features being utilized to offset rankings of non-active software container instances at the expense of active software container instances.

4. The apparatus of claim 1 wherein the two or more periods of time comprise a current time period and one or more historical time periods prior to the current time period, and wherein the consensus ranking aggregation algorithm rewards consistent ranking values across the periodic quality rankings for the current time period and the one or more historical time periods.

5. The apparatus of claim 1 wherein the consensus ranking aggregation algorithm utilizes a Kemeny-Young model.

6. The apparatus of claim 5 wherein the Kemeny-Young model comprises:
   calculating a score for each quality ranking combination of the plurality of software container images, the score for a given quality ranking combination being based at least in part on a distance metric function that measures pairwise disagreements between ranking values of the plurality of software container images in different ones of the periodic quality rankings; and
   selecting one of the quality ranking combinations as the overall quality ranking based at least in part on the calculated scores.

7. The apparatus of claim 6 wherein the distance metric function comprises a Kendall tau rank distance metric that counts a number of pairwise disagreements in ranking values of the plurality of software container images between two of the periodic quality rankings.

8. The apparatus of claim 6 wherein calculating the score for each ranking combination utilizes a brute force approach.

9. The apparatus of claim 6 wherein calculating the score for each ranking combination utilizes a weighted graph-based approach.

10. The apparatus of claim 9 wherein the weighted graph-based approach comprises an integer programming formulation.

11. The apparatus of claim 9 wherein the weighted graph-based approach comprises:
    modeling the periodic quality rankings as a weighted directed graph wherein each vertex of the weighted directed graph represents one of the plurality of software container images, and wherein a given edge connecting a first one of the vertices representing a first one of the plurality of software container images and a second one of the vertices representing a second one of the plurality of software container images comprises (i) a weight representing a number of the periodic quality rankings that rank the first software container image higher than the second software container image and (ii) an orientation from the lower-ranked one of the first software container image and the second software container image to the higher-ranked one of the first software container image and the second software container image; and
    selecting one of the quality ranking combinations as the overall quality ranking based at least in part on the calculated scores comprises selecting a given quality ranking in the weighted directed graph that minimizes the weights of the edges that the given quality ranking disagrees with.

12. The apparatus of claim 1 wherein publishing the overall quality ranking of the plurality of software container images to the software container registry comprises associating individual quality rankings of each of the plurality of software container images from the overall quality ranking with corresponding entries in a catalog of software container images hosted by the software container registry.

13. The apparatus of claim 12 wherein publishing the overall quality ranking of the plurality of software container images to the software container registry further comprises, responsive to a request to view a given entry in the catalog of software container images corresponding to a given one of the plurality of software container images, displaying the individual quality ranking from the overall quality ranking associated with the given software container image.

14. The apparatus of claim 12 wherein publishing the overall quality ranking of the plurality of software container images to the software container registry further comprises, responsive to a request to view two or more entries in the catalog of software container images corresponding to two or more of the plurality of software container images, sorting a display of the two or more entries based on the individual quality rankings from the overall quality ranking associated with the two or more software container images.

15. A computer program product comprising a non-transitory processor-readable storage medium having stored therein program code of one or more software programs, wherein the program code when executed by at least one processing device causes the at least one processing device to perform steps of:

obtaining metrics characterizing performance, over two or more periods of time, of software container instances of each of a plurality of software container images;

determining, for each of the two or more periods of time, a periodic quality ranking of the plurality of software container images based at least in part on the obtained metrics;

generating an overall quality ranking of the plurality of software container images utilizing a consensus ranking aggregation algorithm configured to aggregate the periodic quality rankings of the plurality of software container images across the two or more periods of time; and publishing the overall quality ranking of the plurality of software container images to a software container registry.

16. The computer program product of claim 15 wherein the consensus ranking aggregation algorithm utilizes a Kemeny-Young model.

17. The computer program product of claim 16 wherein the Kemeny-Young model comprises:

calculating a score for each quality ranking combination of the plurality of software container images, the score for a given quality ranking combination being based at least in part on a distance metric function that measures pairwise disagreements between ranking values of the plurality of software container images in different ones of the periodic quality rankings; and selecting one of the quality ranking combinations as the overall quality ranking based at least in part on the calculated scores.

18. A method comprising steps of:

obtaining metrics characterizing performance, over two or more periods of time, of software container instances of each of a plurality of software container images;

determining, for each of the two or more periods of time, a periodic quality ranking of the plurality of software container images based at least in part on the obtained metrics;

generating an overall quality ranking of the plurality of software container images utilizing a consensus ranking aggregation algorithm configured to aggregate the periodic quality rankings of the plurality of software container images across the two or more periods of time; and publishing the overall quality ranking of the plurality of software container images to a software container registry;

wherein the method is performed by at least one processing device comprising a processor coupled to a memory.

19. The method of claim 18 wherein the consensus ranking aggregation algorithm utilizes a Kemeny-Young model.

20. The method of claim 19 wherein the Kemeny-Young model comprises:

calculating a score for each quality ranking combination of the plurality of software container images, the score for a given quality ranking combination being based at least in part on a distance metric function that measures pairwise disagreements between ranking values of the plurality of software container images in different ones of the periodic quality rankings; and selecting one of the quality ranking combinations as the overall quality ranking based at least in part on the calculated scores.

* * * * *